US008160014B2

(12) United States Patent
Ojala et al.

(10) Patent No.: US 8,160,014 B2
(45) Date of Patent: Apr. 17, 2012

(54) CONFIGURATION OF MULTI-PERIODICITY SEMI-PERSISTENT SCHEDULING FOR TIME DIVISION DUPLEX OPERATION IN A PACKET-BASED WIRELESS COMMUNICATION SYSTEM

(75) Inventors: Jussi Ojala, Helsinki (FI); Hai Ming Wang, Beijing (CN); Esa Malkamaki, Espoo (FI); Jing Han, Beijing (CN)

(73) Assignee: Nokia Corporation, Espoo (FI)

( * ) Notice: Subject to any disclaimer, the term of this patent is extended or adjusted under 35 U.S.C. 154(b) by 224 days.

(21) Appl. No.: 12/563,016

(22) Filed: Sep. 18, 2009

(65) Prior Publication Data

US 2010/0182939 A1 Jul. 22, 2010

Related U.S. Application Data

(60) Provisional application No. 61/098,504, filed on Sep. 19, 2008.

(51) Int. Cl.
H04W 4/00 (2009.01)
H04W 72/00 (2009.01)
(52) U.S. Cl. .......................... 370/329; 370/338; 455/450
(58) Field of Classification Search .................. 370/336, 370/329, 328, 321, 395; 455/427, 452, 426, 455/101
See application file for complete search history.

(56) References Cited

U.S. PATENT DOCUMENTS

| 6,408,178 | B1* | 6/2002 | Wickstrom et al. ........... 455/427 |
|---|---|---|---|
| 7,929,921 | B2* | 4/2011 | Love et al. .................... 455/101 |
| 2005/0281214 | A1* | 12/2005 | Misra et al. ................... 370/321 |
| 2007/0133458 | A1* | 6/2007 | Chandra et al. ............... 370/329 |
| 2007/0195787 | A1* | 8/2007 | Alnuweiri et al. ......... 370/395.4 |
| 2008/0117891 | A1* | 5/2008 | Damnjanovic et al. ....... 370/345 |
| 2008/0316957 | A1* | 12/2008 | Shen et al. .................... 370/328 |
| 2009/0003282 | A1* | 1/2009 | Meylan et al. ................ 370/331 |
| 2009/0054006 | A1* | 2/2009 | Cai et al. ......................... 455/73 |
| 2009/0196231 | A1* | 8/2009 | Giaretta et al. ............... 370/328 |
| 2009/0257408 | A1* | 10/2009 | Zhang et al. .................. 370/336 |
| 2010/0031111 | A1* | 2/2010 | Cai et al. ....................... 714/751 |
| 2010/0056136 | A1* | 3/2010 | Zhu ............................ 455/426.1 |
| 2010/0113057 | A1* | 5/2010 | Englund et al. ............ 455/452.1 |
| 2010/0208667 | A1* | 8/2010 | Chun et al. .................... 370/329 |
| 2010/0238875 | A1* | 9/2010 | Sung et al. .................... 370/329 |

FOREIGN PATENT DOCUMENTS

WO 2008/038088 A2 4/2008

OTHER PUBLICATIONS

Catt, CMCC, Qualcomm Europe, "Multiple Patterns for UL SPS", Aug. 18-22, 2008, 4 pages.
3GPP TS 36.213 v8.3.0, "Technical Specification Group Radio Access Network; Evolved Universal Terrestrial Radio Access; Physical Layer Procedures", May 2008, 3 pages.
Nokia, "Way Forward on Configuration of Two Intervals SPS for TDD", Sep. 29-Oct. 3, 2008, 3 pages.
International Search Report and Written Opinion, Received in corresponding International Patent Application No. PCT/IB2009/006899, mailed Jan. 15, 2010, 17 pages.

* cited by examiner

Primary Examiner — Steven H Nguyen
(74) Attorney, Agent, or Firm — Harrington & Smith

(57) ABSTRACT

Systems and methods for determining the periodicity for a multiple periodicity SPS allocation using implicit rules for a TDD communications system are disclosed. A communication terminal such as a UE is provided that may determine the periodicity for a multiple periodicity SPS allocation using implicit rules to calculate a delta value to form a long time period and a shorter time period, forming a periodic pattern where the rules depend on the TDD configuration being used. In another embodiment a communication terminal such as a UE is provided that may determine the periodicity for a multiple periodicity SPS allocation using implicit rules to calculate a delta value to form a long time period and a shorter time period forming a periodic pattern, where the rules depend on the TDD configuration being used and the HARQ process being used.

21 Claims, 14 Drawing Sheets

| Configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIGURE 5

*TDD configuration0: "delta" = 0 for all the HARQ processes*

| Index of sub-frame | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| UL/DL Configuration | D | S | U | U | U | D | S | U | U | U | D | S | U | U | U | D | S | U | U | U | D | S | U | U | U | D | S |
| HARQ Process |  |  | 1 | 2 | 3 |  |  | 4 | 5 | 6 |  |  | 7 | 1 | 2 |  |  | 3 | 4 | 5 |  |  | 6 | 7 | 1 |  |  |

| HARQ process | "Delta" value |
|---|---|
| 1 | 0 |
| 2 | 0 |
| 3 | 0 |
| 4 | 0 |
| 5 | 0 |
| 6 | 0 |
| 7 | 0 |

FIGURE 8

TDD configuration1: "delta" = {1, -1}

| Index of sub-frame | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| UL/DL Configuration | D | S | U | U | D | D | D | S | U | U | D | D | S | U | U | D | D | S | U | U | D | D | S | U | U | D | D | S |
| HARQ Process | | | 1 | 2 | | | | 3 | 4 | | | | 1 | 2 | | | | 3 | 4 | | | | 1 | 2 | | | |

| HARQ process | Delta value |
|---|---|
| 1, 3 | 1 |
| 2, 4 | -1 |

FIGURE 9

TDD configuration2: "delta" = {5} or "delta" = {-5}

| Index of sub-frame | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| UL/DL Configuration | D | S | U | D | D | D | S | U | D | D | D | S | U | D | D | D | S | U | D | D | D | S | U | D | D | D | S |
| HARQ Process | | | 1 | | | | | 2 | | | | | 1 | | | | | 2 | | | | | 1 | | | | |

| HARQ process | Delta value |
|---|---|
| 1 | 5 |
| 2 | 5 |

FIGURE 10

TDD configuration3: "delta" = {1, -2}

| Index of sub-frame | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| UL/DL Configuration | D | S | U | U | U | D | D | D | D | D | D | S | U | U | U | D | D | D | D | D | D | S | U | U | U | D | D |
| HARQ Process |   |   | 1 | 2 | 3 |   |   |   |   |   |   |   | 1 | 2 | 3 |   |   |   |   |   |   |   | 1 | 2 | 3 |   |   |

| HARQ process | Delta value |
|---|---|
| 1, 2 | 1 |
| 3 | -2 |

FIGURE 11

*TDD configuration 4: "delta" = {1, 9} or "delta" = {1, -1}*

| Index of sub-frame | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| UL/DL Configuration | D | S | U | U | D | D | D | D | D | D | D | S | U | U | D | D | D | D | D | D | D | S | U | U | D | D | D |
| HARQ Process | | | 1 | 2 | | | | | | | | | 1 | 2 | | | | | | | | | 1 | 2 | | | |

| HARQ process | Delta value |
|---|---|
| 1 | 1 |
| 2 | -1 |

FIGURE 12

*TDD configuration6: "delta" = 0 (collision happens seldom even "Delta" was not used)*

| Index of sub-frame | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| UL/DL Configuration | D | S | U | U | U | D | S | U | U | D | D | S | U | U | U | D | S | U | U | D | D | S | U | U | U | D | S |
| HARQ Process | | 1 | 2 | 3 | | | | 4 | 5 | | | | 6 | 1 | 2 | | | 3 | 4 | | | | 5 | 6 | 1 | | |

| HARQ process | Delta value |
|---|---|
| 1 | 0 |
| 2 | 0 |
| 3 | 0 |
| 4 | 0 |
| 5 | 0 |
| 6 | 0 |

FIGURE 13

CONFIGURATION OF MULTI-PERIODICITY SEMI-PERSISTENT SCHEDULING FOR TIME DIVISION DUPLEX OPERATION IN A PACKET-BASED WIRELESS COMMUNICATION SYSTEM

CROSS REFERENCE TO RELATED APPLICATION

This application claims the benefit of U.S. Provisional Application No. 61/098,504 entitled "Configuration of Multi-Periodicity Semi-Persistent Scheduling for Time Division Duplex Operation in a Packet-Based Wireless Communication System," filed on Sep. 19, 2008, which is incorporated herein by reference.

TECHNICAL FIELD

The present invention is directed, in general, to communication systems and, more particularly, to a system and method for providing the use of user equipment or mobile transceiver devices in a packet based communication system that includes VoIP packet support and time division duplex (TDD) communication devices while allowing for efficient use, simple implementation and conservation of system resources.

BACKGROUND

As wireless communication systems such as cellular telephone, satellite, and microwave communication systems become widely deployed and continue to attract a growing number of users, there is a pressing need to accommodate a large and variable number of communication subsystems transmitting a growing volume of data with a fixed resource such as a fixed channel bandwidth accommodating a fixed data packet size. Traditional communication system designs employing a fixed resource (e.g., a fixed data rate for each user) have become challenged to provide high, but flexible, data transmission rates in view of the rapidly growing customer base.

The third generation partnership project long term evolution ("3GPP LTE") is the name generally used to describe an ongoing effort across the industry to improve the universal mobile telecommunications system ("UMTS") for mobile communications. The improvements are being made to cope with continuing new requirements and the growing base of users. Goals of this broadly based project include improving communication efficiency, lowering costs, improving services, making use of new spectrum opportunities, and achieving better integration with other open standards and backwards compatibility with some existing infrastructure that is compliant with earlier standards. The project envisions a packet switched communications environment with support for such services as VoIP ("Voice over Internet Protocol"). The 3GPP LTE project is not itself a standard-generating effort, but will result in new recommendations for standards for the UMTS.

The UTRAN includes multiple Radio Network Subsystems (RNSs), each of which contains at least one Radio Network Controller (RNC). However, it should be noted that the RNC may not be present in the actual implemented systems incorporating Long Term Evolution (LTE) of UTRAN (E-UTRAN). LTE may include a centralized or decentralized entity for control information. In UTRAN operation, each RNC may be connected to multiple Node Bs which are the UMTS counterparts to Global System for Mobile Communications (GSM) base stations. In E-UTRAN systems, the e-Node B may be, or is, connected directly to the access gateway ("aGW," sometimes referred to as the services gateway "sGW"). Each Node B may be in radio contact with multiple UEs (generally, user equipment including mobile transceivers or cellphones, although other devices such as fixed cellular phones, mobile web browsers, laptops, PDAs, MP3 players, gaming devices with transceivers may also be UEs) via the radio Uu interface.

The wireless communication systems as described herein are applicable to, for instance, 3GPP LTE compatible wireless communication systems and of interest is an aspect of LTE referred to as "evolved UMTS Terrestrial Radio Access Network," or E-UTRAN. In general, E-UTRAN resources are assigned more or less temporarily by the network to one or more UEs by use of allocation tables, or more generally by use of a downlink resource assignment channel or physical downlink control channel (PDCCH). LTE is a packet-based system and, therefore, there may not be a dedicated connection reserved for communication between a UE and the network. Users are generally scheduled on a shared channel every transmission time interval (TTI) by a Node B or an evolved Node B (e-Node B). A Node B or an e-Node B controls the communications between user equipment terminals in a cell served by the Node B or e-Node B. In general, one Node B or e-Node B serves each cell. A Node B may be sometimes referred to as a "base station." Resources needed for data transfer are assigned either as one time assignments or in a persistent/semi-static way. The LTE, also referred to as 3.9G, generally supports a large number of users per cell with quasi-instantaneous access to radio resources in the active state. It is a design requirement that at least 200 users per cell should be supported in the active state for spectrum allocations up to 5 megahertz (MHz), and at least 400 users for a higher spectrum allocation.

In order to facilitate scheduling on the shared channel, the e-Node B transmits a resource allocation to a particular UE in a downlink-shared channel (PDCCH) to the UE. The allocation information may be related to both uplink and downlink channels. The allocation information may include information about which resource blocks in the frequency domain are allocated to the scheduled user(s), the modulation and coding schemes to use, what the size of the transport block is, and the like.

The lowest level of communication in the E-UTRAN system, Level 1, is implemented by the Physical Layer ("PHY") in the UE and in the e-Node B and the PHY performs the physical transport of the packets between them over the air interface using radio frequency signals. In order to ensure a transmitted packet was received, an automatic retransmit request ("ARQ") and a hybrid automatic retransmit request ("HARQ") approach is provided. Thus whenever the UE receives packets through one of several downlink channels, including command channels and shared channels, the UE performs a communications error check on the received packets, typically a Cyclic Redundancy Check (CRC), and in a later sub-frame following the reception of the packets, transmits a response on the uplink to the e-Node B or base station. The response is either an Acknowledge (ACK) or a Not Acknowledged (NACK) message. If the response is a NACK, the e-Node B automatically retransmits the packets in a later sub-frame on the downlink or DL. In the same manner, any UL transmission from the UE to the e-Node B is responded to, at a specific sub-frame later in time, by a NACK/ACK message on the DL channel to complete the HARQ. In this manner, the packet communications system remains robust with a low latency time and fast turnaround time.

E-UTRAN networks may provide VoIP (Voice over Internet Protocol) support. To provide this support, the UE may transmit to the e-Node B over the air interface packets at a predetermined timing interval, so that the voice signals that are eventually formed from these VoIP packets are free of jitter and noise that would otherwise result. Semi-persistent scheduling ("SPS") may be used to allocate uplink (UL) physical resource blocks (PRBs) to ensure the VoIP packets are delivered at appropriate intervals to maintain quality of service and reduce control signaling cost. The need to provide UL packets from the UE to the e-Node B has certain impacts on other aspects of the operations of the physical layer, including retransmit requests and synchronous HARQ processes that result from previous UL packet transmissions that were not received by the e-Node B. A UE may have a transmission conflict between a scheduled UL resource such as an initial transmission for a VoIP packet and a need to service a HARQ retransmission request packet at the appropriate time.

A continuing need thus exists for a system, methods and circuitry to implement support for certain persistently scheduled services that have predetermined timing requirements in the E-UTRAN system, while avoiding collisions with retransmission requests, without the need for additional communications from higher layers or burdening other radio resources.

SUMMARY OF THE INVENTION

These and other problems are generally solved or circumvented, and technical advantages are generally achieved, by advantageous embodiments of the present invention which include an apparatus and methods according to an embodiment for providing a UE supporting the VoIP services or other scheduled services on a radio communications interface with retransmit requests.

According to an illustrative embodiment, a communication terminal such as a UE is provided that may determine the periodicity for a multiple periodicity SPS allocation using implicit rules to calculate a delta value to form the first time period and the second time period forming a periodic pattern.

According to another illustrative embodiment, a communication terminal such as a UE is provided that may determine the periodicity for a multiple periodicity SPS allocation using implicit rules to calculate a delta value to form the first time period and the second time period forming a periodic pattern where the rules depend on the TDD configuration being used.

According to another illustrative embodiment, a communication terminal such as a UE is provided that may determine the periodicity for a multiple periodicity SPS allocation using implicit rules to calculate a delta value to form the first time period and the second time period forming a periodic pattern where the rules depend on the TDD configuration being used and the HARQ process being used.

According to another illustrative embodiment, a communication terminal such as a UE is provided that may determine the periodicity for a multiple periodicity SPS allocation using implicit rules to calculate a delta value to form the first time period and the second time period forming a periodic pattern for a TDD frame where the rules depend on the system frame number (SFN) when a semi-persistent allocation begins.

According to another illustrative embodiment, a communication terminal such as a UE is provided in an E-UTRAN system using TDD communications that may determine the periodicity for a multiple periodicity SPS allocation using implicit rules to calculate a delta value to form the first time period and the second time period, then forming a periodic pattern for a TDD frame where the rules depend on the system frame number (SFN) when a semi-persistent allocation begins.

According to another illustrative embodiment, a communication terminal such as a UE is provided in an E-UTRAN system using TDD communications that may determine the periodicity for a multiple periodicity SPS allocation using implicit rules to calculate a delta value to form the first time period and the second time period, then forming a periodic pattern for a TDD frame where the rules depend on a value for the first time period or the second period communicated by a higher level signaling during a configuration process.

According to another illustrative embodiment, a communication terminal such as a UE is provided in an E-UTRAN system using TDD communications that may determine the periodicity for a multiple periodicity SPS allocation using implicit rules to calculate a delta value to form the first time period and the second time period, then forming a periodic pattern for a TDD frame where the rules depend on the TDD UL/DL configuration, and if the TDD configuration is 0, 5 or 6, the delta value is 0.

According to another illustrative embodiment, a communication terminal such as a UE is provided in an E-UTRAN system using TDD communications that may determine the periodicity for a multiple periodicity SPS allocation using implicit rules to calculate a delta value to form the first time period and the second time period, then forming a periodic pattern for a TDD frame, where if the TDD configuration value is between 1 and 4, the rules depend on whether the semi-persistent allocation begins in an uplink sub-frame that is the last one in a frame period (i.e., 5 ms or 10 ms) or if there is only one uplink sub-frame in a frame period (i.e., 5 ms or 10 ms).

According to another illustrative embodiment, a communication terminal such as a UE is provided in an E-UTRAN system using TDD communications that may determine the periodicity for a multiple periodicity SPS allocation using implicit rules to calculate a delta value to form the first time period of a period plus a delta and the second time period of the period minus a delta, then forming a periodic pattern for a TDD frame, where if the TDD UL/DL configuration is 1, 3 and 4, the rules depend on whether the semi-persistent allocation begins in an uplink sub-frame that is not the last in a period, if so a delta value of "1" is determined; if the allocation begins in an uplink sub-frame that is the last in a period, a delta value of "1-uplink sub-frame number in a frame period" is determined. When TDD UL/DL configuration is 2, there is only one uplink sub-frame in a frame period, so a delta value of "1+downlink sub-frame number in a period" or a delta value of "−1−downlink sub-frame number in a frame period" is determined.

According to another illustrative embodiment, a method for implicitly determining two time periods of a multiple periodicity SPS allocation is performed, wherein a delta value is determined from rules dependent on the TDD configuration in use by a system.

According to another illustrative embodiment, a method for implicitly determining two time periods of a multiple periodicity SPS allocation is performed, wherein the first time period is equal to a SPS period plus a delta value, and a second time period is equal to a SPS period minus a delta value, and the delta value is determined from rules dependent on the TDD configuration in use by a system.

According to another illustrative embodiment, a method for implicitly determining two time periods of a multiple periodicity SPS allocation in a UE communicating frames over a TDD interface is performed, wherein the first time period is equal to a SPS period plus a delta value, and a second time period is equal to a SPS period minus a delta value, and the delta value is determined from rules dependent on the TDD configuration in use by the UE.

According to another illustrative embodiment, a method for determining two time periods of a multiple periodicity SPS allocation in a UE communicating frames over a TDD interface is performed, wherein the first time period (or second time period) is communicated to the UE, and the second time period (or the first time period) is calculated from the first time period (or the second time period) and two known parameters.

According to another illustrative embodiment, a method for implicitly determining two time periods of a multiple periodicity SPS allocation in a UE communicating frames over a TDD interface is performed, wherein the first time period is equal to a SPS period plus a delta value, and a second time period is equal to a SPS period minus a delta value, and the delta value is determined from rules dependent on the TDD configuration in use by the UE which is one of seven possible TDD configurations.

According to another illustrative embodiment, instructions executable by a programmable device are provided stored on a computer readable medium, wherein when executed, the instructions perform a method for implicitly determining two time periods of a multiple periodicity SPS allocation in a UE communicating frames over a TDD interface, wherein the first time period is equal to a SPS period plus a delta value, and a second time period is equal to a SPS period minus a delta value, and the delta value is determined from rules dependent on the TDD configuration in use by the UE which is one of seven possible TDD configurations.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in claims that may be presented.

BRIEF DESCRIPTION OF THE DRAWINGS

For a more complete understanding of the invention, and the advantages thereof, reference is now made to the following descriptions taken in conjunction with the accompanying drawing, in which:

FIG. 5 depicts the TDD configurations available in E-UTRAN for TDD radio frames;

FIG. 8 illustrates the delta values given by embodiments of the present invention for a TDD configuration 0;

FIG. 9 illustrates the delta values given by embodiments of the present invention for a TDD configuration 1;

FIG. 10 illustrates the delta values given by embodiments of the present invention for a TDD configuration 2;

FIG. 11 illustrates the delta values given by embodiments of the present invention for a TDD configuration 3;

FIG. 12 illustrates the delta values given by embodiments of the present invention for a TDD configuration 4;

FIG. 13 illustrates the delta values given by embodiments of the present invention for a TDD configuration 6.

DETAILED DESCRIPTION

The illustrative embodiments described are directed to an application in an E-UTRAN system with TDD. However, the embodiments are not limited to this example application and the use of the embodiments in other communications systems to provide implicit rules for determining and configuring the multiple periodicity of semi-persistent scheduling of resources is envisioned as part of the present invention and are within the scope of any claims presented.

Figure 1:
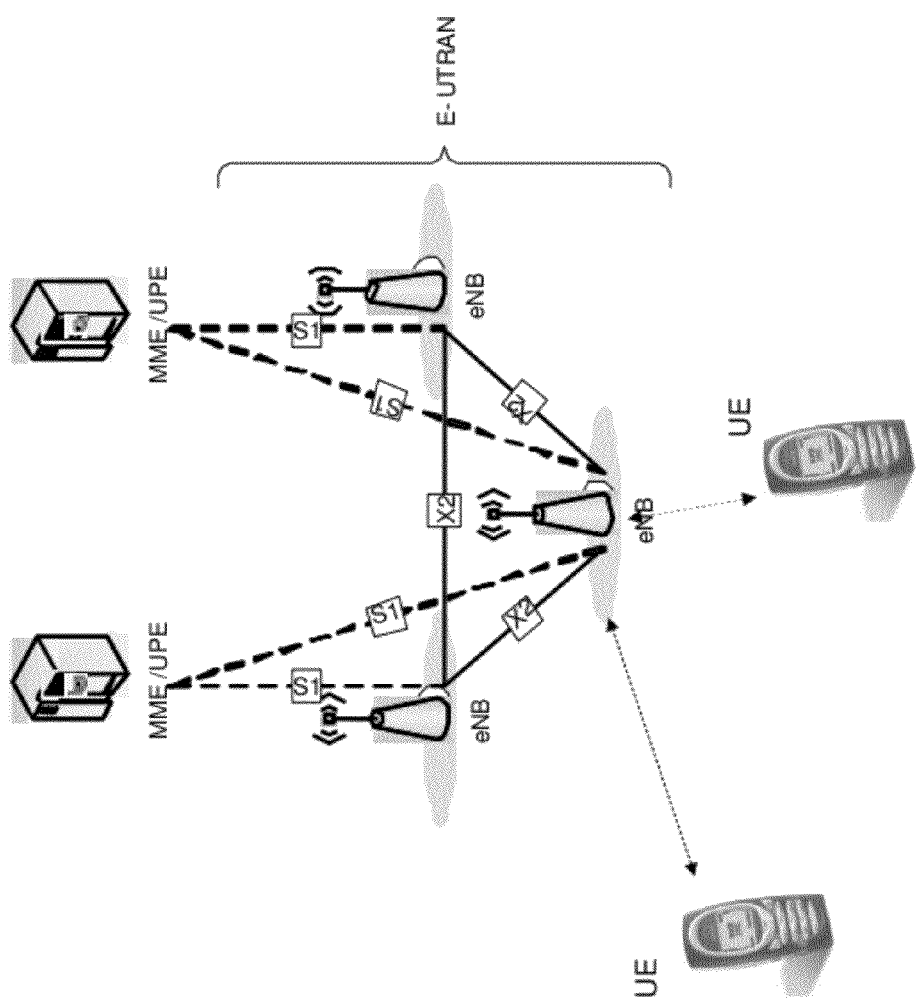
FIG. 1 illustrates a system level diagram of a radio frequency interface communication system including a wireless communication system.

Referring initially to FIG. 1, illustrated is a system level diagram of a radio frequency interface communication system including a wireless communication system that provides an environment for the application of the principles of the present invention. The wireless communication system may be configured to provide features included in the evolved UMTS terrestrial radio access network ("E-UTRAN") universal mobile telecommunications services. Mobile management entities ("MMEs") and user plane entities ("UPEs") provide control functionality for one or more E-UTRAN node B (designated "e-Node B," an "evolved node B," also commonly referred to as a "base station") via an S1 interface or communication link. The base stations communicate via an X2 interface or communication link. The various communication links are typically fiber, microwave, or other high-frequency metallic communication paths such as coaxial links, or combinations thereof.

The base stations communicate over an air interface with user equipment (designated "UE"), which is typically a mobile transceiver carried by a user. Alternatively, the user equipment may be a mobile web browser, text messaging appliance, a laptop with a mobile PC modem, or other user device configured for cellular or mobile services. Thus, communication links (designated "Uu" communication links) coupling the base stations to the user equipment are air links employing a wireless communication signal. For example, the devices may communicate using a known signaling approach such as a 1.8 GHz orthogonal frequency division multiplex ("OFDM") signal. Other radio frequency signals may be used.

The e-Node Bs may host functions such as radio resource management (e.g., internet protocol ("IP"), header compression and encryption of user data streams, ciphering of user data streams, radio bearer control, radio admission control, connection mobility control, dynamic allocation of resources to user equipment in both the uplink and the downlink), selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The MME/UPEs may host functions such as distribution of paging messages to the base stations, security control, terminating U-plane packets for paging reasons, switching of U-plane for support of the user equipment mobility, idle state mobility control, and system architecture evolution bearer control. The UEs receive an allocation of a group of information blocks labeled physical resource blocks ("PRBs") from the e-Node Bs.

Figure 2:
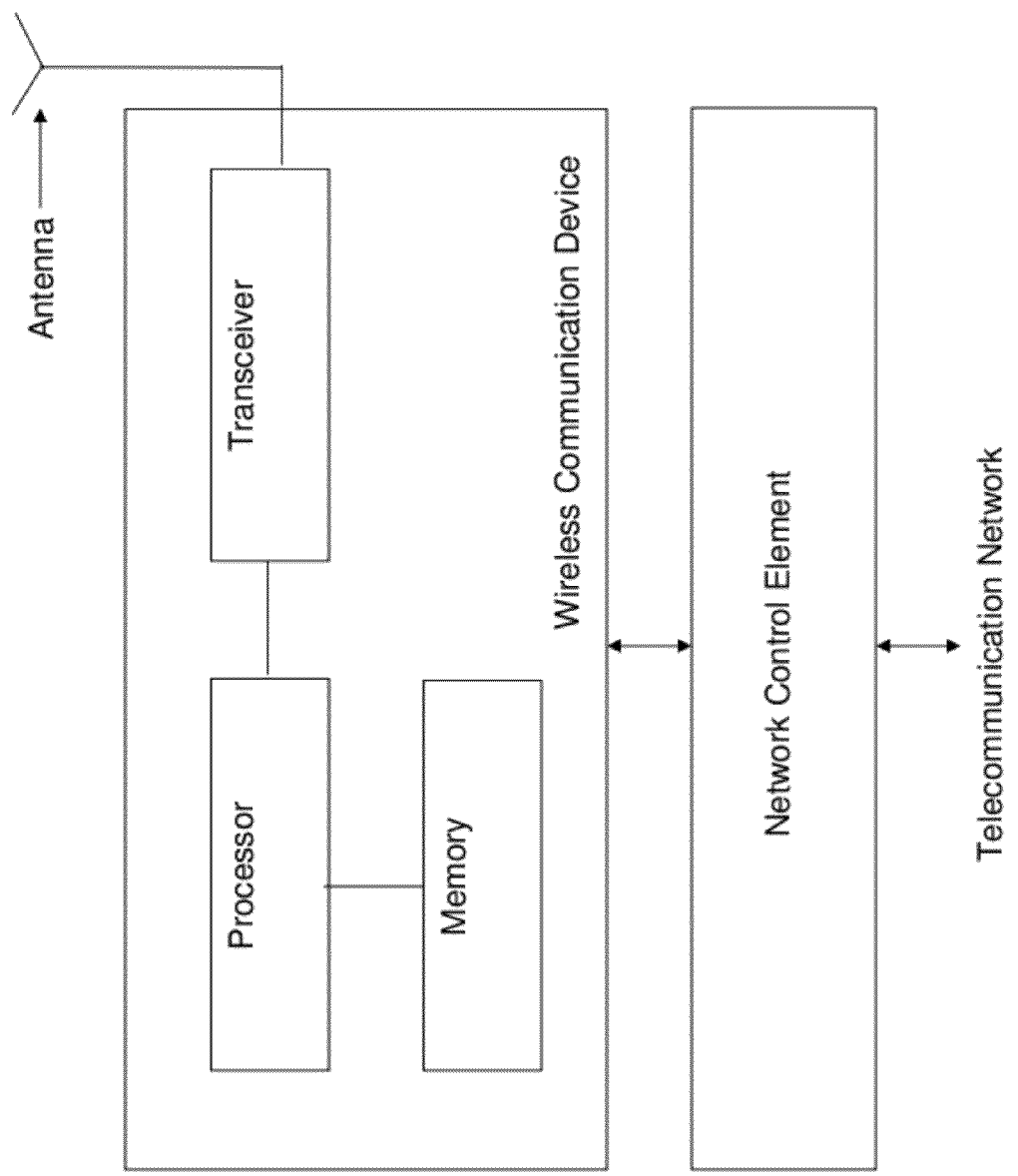
FIG. 2 illustrates a simplified system level diagram of an example communication element of a communication system.

FIG. 2 illustrates a simplified system level diagram of an example communication element of a communication system that provides an environment and structure for application of the principles of the present invention. The communication element may represent, without limitation, an apparatus including an e-Node B, UE such as a terminal or mobile station, a network control element, or the like. The communication element includes, at least, a processor, memory that stores programs and data of a temporary or more permanent nature, an antenna, and a radio frequency transceiver coupled to the antenna and the processor for bidirectional wireless communication. Other functions may also be provided. The communication element may provide point-to-point and/or point-to-multipoint communication services.

The communication element, such as an e-Node B in a cellular network, may be coupled to a communication network element, such as a network control element of a public switched telecommunication network ("PSTN"). The network control element may, in turn, be formed with a processor, memory, and other electronic elements (not shown). Access to the PSTN may be provided using fiber optic, coaxial, twisted pair, microwave communication, or similar communication links coupled to an appropriate link-terminating element. A communication element formed as a UE is generally a self-contained device intended to be carried by an end user and communicating over an air interface to other elements in the network.

The processor in the communication element, which may be implemented with one or a plurality of processing devices, performs functions associated with its operation including, without limitation, encoding and decoding of individual bits forming a communication message, formatting of information, and overall control of the communication element, including processes related to management of resources. Exemplary functions related to management of resources include, without limitation, hardware installation, traffic management, performance data analysis, tracking of end users and mobile stations, configuration management, end user administration, management of the mobile station, management of tariffs, subscriptions, and billing, and the like. The execution of all or portions of particular functions or processes related to management of resources may be performed in equipment separate from and/or coupled to the communication element, with the results of such functions or processes communicated for execution to the communication element. The processor of the communication element may be of any type suitable to the local application environment, and may include one or more of general-purpose computers, special-purpose computers, microprocessors, digital signal processors ("DSPs"), and processors based on a multi-core processor architecture, as non-limiting examples.

The transceiver of the communication element modulates information onto a carrier waveform for transmission by the communication element via the antenna to another communication element. The transceiver demodulates information received via the antenna for further processing by other communication elements.

The memory of the communication element, as introduced above, may be of any type suitable to the local application environment and may be implemented using any suitable volatile or nonvolatile data storage technology, such as a semiconductor-based memory device, a magnetic memory device and system, an optical memory device and system, fixed memory, and removable memory. The programs stored in the memory may include program instructions that, when executed by an associated processor, enable the communication element to perform tasks as described herein. Exemplary embodiments of the system, subsystems, and modules as described herein may be implemented, at least in part, by computer software executable by processors of, for instance, the mobile station and the base station, or by hardware, or by combinations thereof. Other programming may be used such as firmware and/or state machines. As will become more apparent, systems, subsystems and modules may be embodied in the communication element as illustrated and described above.

Figure 3:
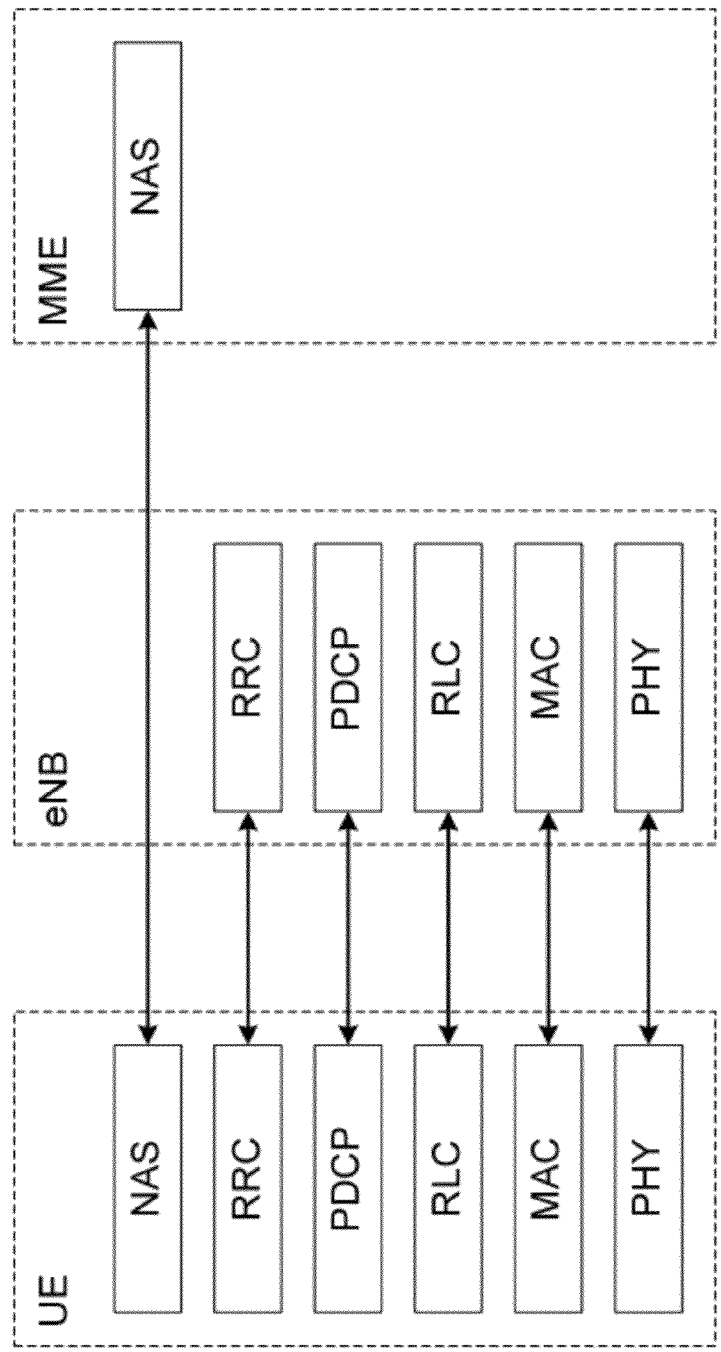
FIG. 3 illustrates a block diagram of an embodiment of a UE and an e-Node B.

FIG. 3 depicts a block diagram of an embodiment of a UE and an e-Node B constructed according to the principles of the present invention and coupled to an MME. The UE and the e-Node B each include a variety of layers and subsystems: the physical layer ("PHY") subsystem, a medium access control layer ("MAC") subsystem, a radio link control layer ("RLC") subsystem, a packet data convergence protocol layer ("PDCP") subsystem, and a radio resource control layer ("RRC") subsystem. Additionally, the user equipment and the mobile management entity ("MME") include a non-access stratum ("NAS") subsystem.

The physical layer subsystem supports the physical transport of packets over the LTE air interface and provides, as non-limiting examples, cyclic redundancy check ("CRC") insertion (e.g., a 24 bit CRC is a baseline for physical downlink shared channel ("PDSCH"), channel coding (e.g., turbo coding based on QPP inner interleaving with trellis termination), physical layer hybrid-automatic repeat or retransmit request ("HARQ") processing, and channel interleaving. The physical layer subsystem also performs scrambling such as transport-channel specific scrambling on a downlink-shared channel ("DL-SCH"), broadcast channel ("BCH") and paging channel ("PCH"), as well as common multicast channel ("MCH") scrambling for all cells involved in a specific multimedia broadcast multicast service single frequency network ("MBSFN") transmission. The physical layer subsystem also performs signal modulation such as quadrature phase shift keying ("QPSK"), 16 quadrature amplitude modulation ("QAM") and 64 QAM, layer mapping and pre-coding, and mapping to assigned resources and antenna ports. The media access layer or MAC performs the HARQ functionality and other important functions between the logical transport layer, or Level 2, and the physical transport layer, or Level 1.

Each layer is implemented in the system and may be implemented in a variety of ways. A layer such as the PHY in the UE may be implemented using hardware, software, programmable hardware, firmware, or a combination of these as is known in the art. Programmable devices such as DSPs, RISC, CISC, microprocessors, microcontrollers, and the like may be used to perform the functions of a layer. Reusable design cores or macros as are provided by vendors as ASIC library functions, for example, may be created to provide some or all of the functions and these may be qualified with various semiconductor foundry providers to make design of new UEs, or e-Node B implementations, faster and easier to perform in the design and commercial production of new devices.

The E-UTRAN system architecture has several significant features that impact timing in the system. A transmission time interval ("TTI") is defined and users (e.g., UE or mobile transceivers) are scheduled on a shared channel every TTI. The majority of UE or mobile transceivers considered in the implementation of the E-UTRAN are full duplex devices. These UEs can therefore receive control and data allocations and packets from the e-NODE B or base station they are connected to in any sub-frame interval in which they are active. The UE detects when resources are allocated to it in the allocation messages on the physical downlink control channel (PDCCH). When downlink resources are allocated to a UE, the UE can determine that data or other packets are going to be transmitted towards it in the present frame or coming frames. Also, the UE may have uplink resources allocated to it. In this case the UE will be expected to transmit towards the e-Node B in coming frames on the uplink based on the allocated UL resources.

Additional timing related services are present in the environment. The E-UTRAN communications environment supports VoIP communication. The use of VoIP packets creates another cyclic pattern within the system. A typical cycle for VoIP would be 20 milliseconds although 40 milliseconds, 60 milliseconds and 80 milliseconds may also be used in case packet bundling. 20 milliseconds as a VoIP interval will be used as a non-limiting default example for VoIP packets throughout the rest of this specification text. Further, the E-UTRAN communications system provides automatic retransmission request (ARQ) and hybrid automatic retransmission request (HARQ) support. The HARQ is supported by the UE and this support has two different dimensions. In the downlink direction, asynchronous HARQ is supported. However, the uplink or UL channel is a different standard channel that uses single carrier FDMA (SC-FDMA) and as currently provided, requires a synchronous HARQ. That is, in the uplink direction, after a packet is transmitted to the e-Node B, an ACK/NACK (acknowledged/not acknowledged) response is transmitted by the e-Node B towards the UE a definite time period later, after which the UE, in case NACK was received, will retransmit the packet in UL direction in a given sub-frame after a predetermined delay.

The E-UTRAN specifications support air interface signaling using both frequency division duplex (FDD), where uplink (signaling from the UE to the e-Node B) and downlink (signaling from the e-Node B towards the UE) can occur at the same time but are spaced apart at different frequencies; and time division duplex (TDD), where the UL and DL frames are communicated on the same carrier but spaced apart in time. Of particular interest to the embodiments of the present invention are the frame structures of TDD radio frames. The frame structures have been selected so that TDD and FDD services may be supported in the same environment and dual-mode devices may be easily implemented. The selection of the FDD or TDD services may depend on the type of data, whether the data transmission is asymmetric (for example, internet browsing tends to be very heavy on the downlink, while voice may be more or less symmetric on both downlink and uplink) the environment, and other parameters, there are advantages and disadvantages to each that are known to those skilled in the art.

The technical specifications (TS) document entitled "3GPP TS 36.300" version 8.5.0 (2008-05) available from the website www.3gpp.org provides in part the specifications for the physical interfaces for the E-UTRAN networks.

Figure 4:
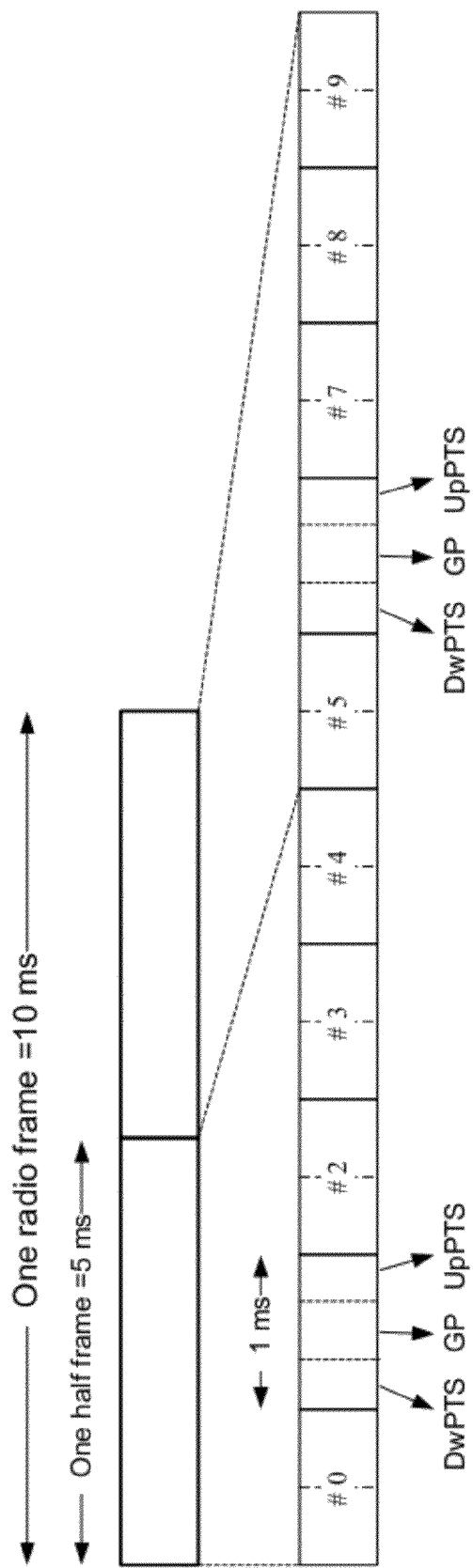
FIG. 4 illustrates the type 2 transport frame used in the E-UTRAN system to physically communicate packets to and from, for example, an e-Node B device using TDD.

FIG. 4 depicts, in very simple form, the type 2 transport frame used in the E-UTRAN system to physically communicate packets to and from, for example, an e-Node B device and one or more UE devices over the air interface using TDD. TS 36.300 v8.5.0 describes the TDD frame in more detail at pages 19-20. A radio frame in the system is presently defined as having a length Ts of 10 milliseconds. The radio frame is further subdivided into 10 sub-frames, each having a length Ts of 1 millisecond. Each sub-frame is further divided again into two slots; each slot has a length of 0.5 milliseconds as shown.

The TDD frame further has three special fields that may be varied in length to form a 1 millisecond sub-frame. These special fields are the downlink pilot time slot (DwPTS), the guard period (GP) and the uplink pilot time slot (UpPTS). The TDD frame is the same length (10 milliseconds, which is 2 half-frames, or 10 sub-frames, each having two slots) as the FDD transport frame, making dual mode equipment easier to implement.

The E-UTRAN TDD frame is further designed to have both 5 millisecond and 10 millisecond switch point periodicity. There are seven configurations defined for the TDD that determine which arrangement of downlink and uplink patterns are to be used. FIG. 5 presents the TDD configuration patterns, which would be chosen by the radio resource controller RRC and communicated to the UE by the e-Node B, so the configuration pattern selected is known to both the UE and the e-Node B.

In the E-UTRAN cellular system, the available capacity of control signalling is limited to some extent. To alleviate some of the signalling burden, signalling of radio resource allocation and related information to correctly encode or decode the information may be allocated for longer periods of time in some of the radio systems (the most often used control signalling). Those resource allocations can be periodically valid in this case. If the system is using synchronous HARQ (retransmission request) and the resource allocation time period is a multiple of the HARQ Round Trip Time (RTT), there is a possibility that the UE has two conflicting UL allocations and without more information, the UE would be unaware whether the particular UL allocation should be used for transmission of the periodic data, such as VoIP packets, or re-transmission of a previously transmitted, but not received, packet that is subject to a re-transmission request from the e-Node B receiver.

Semi-persistent scheduling (SPS) is proposed to be used for pre-allocating the UE resources. These pre-allocated resources are for the initial transmission (of new data) in the LTE system. For SPS, initial/new transmissions are persistently allocated. Retransmissions of previously transmitted packets are dynamically scheduled by level one or level two ("L1/L2") signaling. Alternatively, re-transmissions could be sent non-adaptively via ACK/NACK information.

The UL in LTE uses synchronous HARQ. When a packet is not received, a downlink (DL) message indicates retransmission is required. There are some problems identified for most UL/DL configurations in TDD because the synchronous HARQ round trip time (RTT) is 10 ms. A particular example of importance is when VoIP is supported. When UL SPS is used for VoIP (with an AMR codec periodicity of 20 ms), the second retransmission of a previous packet may collide with the next SPS UL allocation, since the time period of SPS resource is two times the time period of the HARQ RTT.

Figure 6:
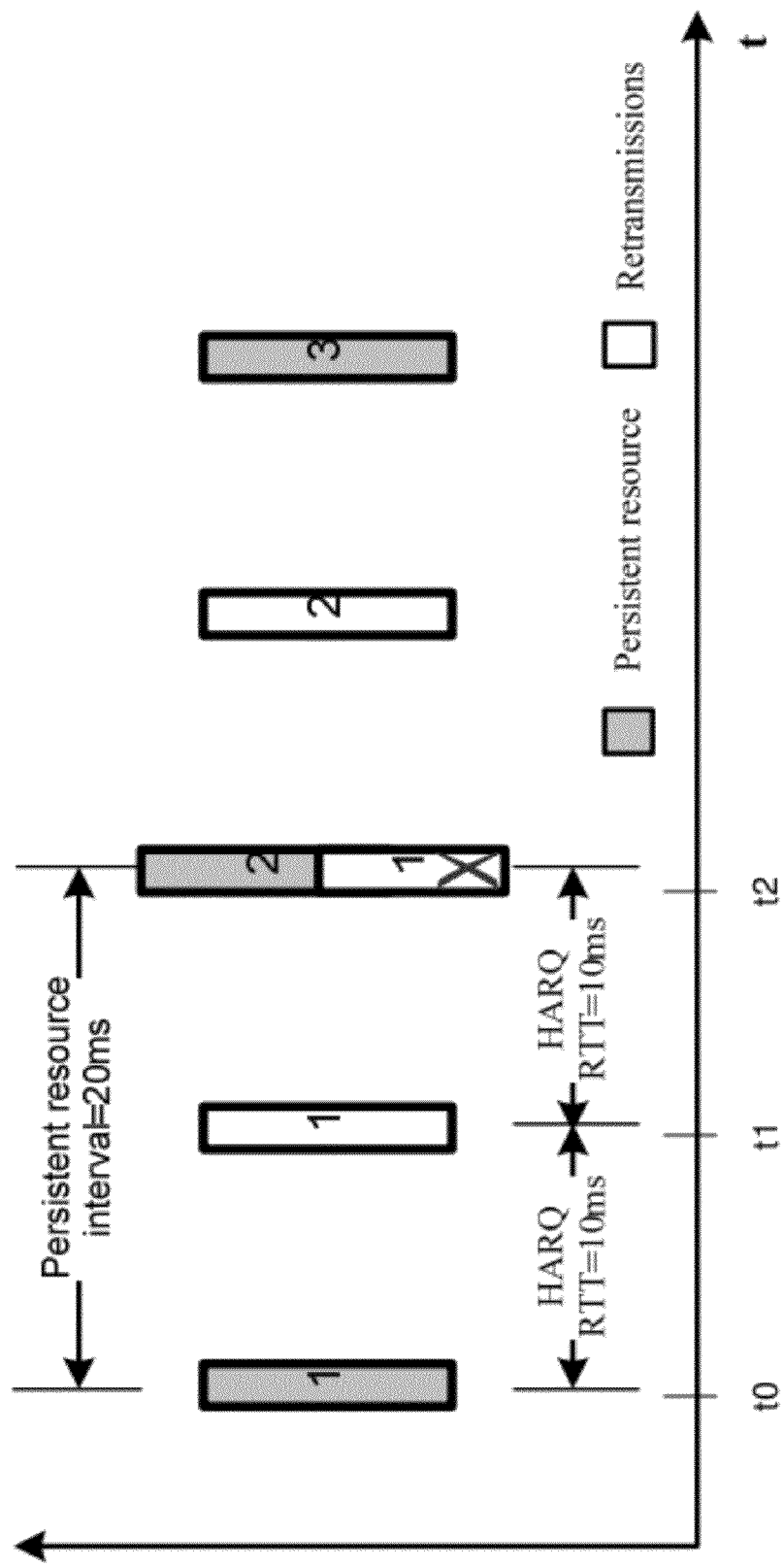
FIG. 6 illustrates an example of timing of a SPS allocation and HARQ processes in a TDD communication without multiple periodicity.

FIG. 6 depicts the conflict problem. In FIG. 6, a sequence of UL resources is shown. At time t0 the first UL packet which, for example, is a VoIP transmit packet that is allocated by a SPS allocation, is transmitted. A retransmit request in the form of a HARQ is received by the UE from the e-Node B (for simplicity, the downlink signal indicating the HARQ is not shown). At time t1, the initial packet is retransmitted. This is shown at a 10 millisecond time interval, the round trip time RTT for the HARQ. At time t2, a second UL allocation for the next VoIP packet to be transmitted occurs at the same time as the next HARQ process for the first packet, which in this example still has not been correctly received. At time t2, a conflict occurs. The question is how to resolve this UE scheduling conflict.

A basic approach to this problem is described in the paper entitled "Uplink VoIP Performance in E-UTRAN TDD Mode", by Jiang, et al., 2008 IEEE 67th Vehicular Technology Conference-Spring, May 11-14, 2008. The frame sequence for TDD and the SPS allocations are studied using a basic approach to handling these resource allocation collisions. In the most basic approach, servicing the HARQ retransmit request is given priority and is thus performed at time t2 in the figure, and using a physical downlink control channel ("PDCCH") the e-Node B allocates upcoming UL resources so that the transmission of the second VoIP packet is delayed to the next UL resource allocation. Of course, the retransmit request may occur again, and again conflict with the SPS allocations in the future, so this case must be handled. Also, delaying the VoIP UL allocation for the second packet has negative impacts on the quality of the VoIP services provided, as the desired 20 millisecond interval for VoIP packets is not maintained in this approach.

Recently, a proposal was made to a 3GPP working group to provide a more effective solution to the TDD HARQ and VoIP SPS resource allocation problem. In a document labeled "3GPP TSG RAN WG2 #63", numbered R2-084841, and titled "Multiple Patterns for UL SPS", published August 2008, and available from the 3GPP website www.3gpp.org, a proposal was made to use multiple periodicity SPS patterns.

Figure 7:
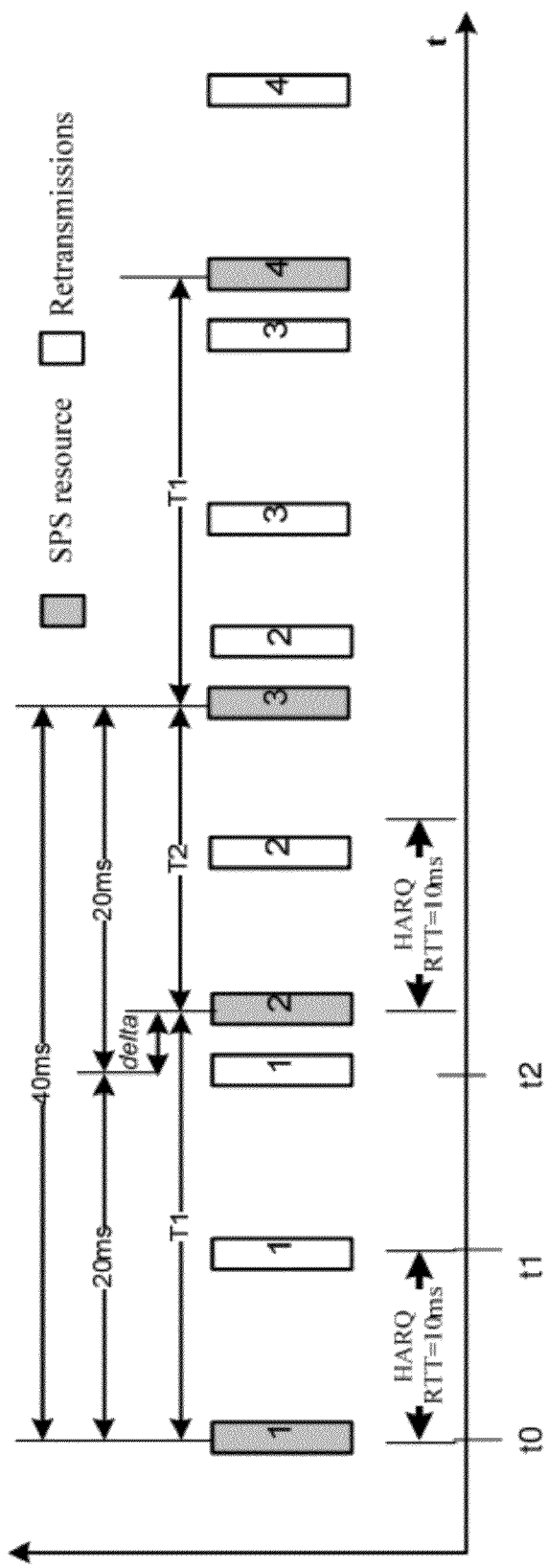
FIG. 7 illustrates an example of timing of a multiple periodicity SPS allocation in a TDD communication performed according to embodiments of the present invention.

FIG. 7 illustrates the scheme from the proposal. In the example, T1 is used for the first period and T2 is used for the second period. If "delta" is a positive value, then T1 is a longer periodicity, otherwise T1 is a shorter periodicity.

The two SPS periods are related by:

$T1 = SPS\ periodicity + delta;$ $T2 = SPS\ periodicity - delta;$

The two periods T1, T2 are not equal, and the sum of T1, T2 in this example is 40 milliseconds—a multiple of the desired 20 millisecond interval. Thus, if the SPS periodicity and the value "delta" are known, the periods T1 and T2 are then easily determined Note that delta can be a positive or negative integer. As can be seen from FIG. 7, by moving the SPS allocations around slightly, the conflict between the HARQ retransmission and the SPS allocation is removed. However, if the HARQ process continues for several retransmission requests, the conflict will again arise. This occurrence should not be typical, and if it occurs, the basic approach above can be used to resolve it.

However, the actual signalling and resources required to perform this proposed method is not straightforward. As presently proposed, radio resource control ("RRC") level signalling is required to provide the two values, "SPS periodicity" and "delta", from the e-Node B to the UE. The actual delta value that should be used will also depend on the particular TDD configuration used, and the HARQ processes used. Some of this information is known at the time the system parameters are communicated in the system by RRC signalling, but the HARQ process used in the UL allocations is unknown at the time when RRC signalling is performed. Thus, the e-Node B can not determine the correct delta value at this point in the process. If it is determined that the e-Node B would also determine the HARQ process at the time of the RRC signalling process in the system operation, that would reduce the e-Node B scheduling freedom later, which undesirably reduces the efficiency of the system by removing some options the e-Node B could otherwise use. Thus, the use of RRC level signalling to communicate the "delta" value to be used for the multiple SPS periodicity is not a preferred approach.

Embodiments of the present invention provide methods for providing the needed delta and SPS periodicity by performing a set of implicit rules. In this manner, the need for additional RRC level signalling in the system is reduced or alleviated. In the preferred embodiments, the implicit rules are arranged so that the UE and e-Node B can determine the value for delta and the values for T1 and T2, without requiring these further RRC or control channel communications. Thus, the advantages of providing the multiple periodicity in the SPS allocations can be achieved without the need for using additional control channel resources in the limited control channel signalling available. Providing the multiple periodicity also reduces the likelihood of a UL resource conflict with a pending HARQ process as shown in FIG. 7.

In a first embodiment of the present invention, the "delta" value to be used for the multiple periodicity of SPS allocations, for example to determine T1 and T2 in the situation illustrated in FIG. 7, is determined from a set of rules based on the TDD configuration selected and the HARQ processes. In this embodiment, no signalling is done at any level, the delta value for the multiple periodicity is implicitly determined from the TDD configuration used.

In a second embodiment of the present invention, one additional signalling message is provided, that is simply to turn the multiple periodicity SPS feature "on" or "off". This signaling may be defined as an optional signal in the RRC level, and if it is not present, the default value is "off".

For either of these two embodiments, another set of rules needs to be developed for implicitly determining the delta value for each TDD configuration/HARQ process combination.

Either of the embodiments above may be used with either of the following rules for determining "delta".

A first set of rules that may be used with either of the above options is:

For TDD configurations 0 and 6;
"Delta"=0 (because collision happens seldom even when "Delta" was not used)

For TDD configurations 1, 2, 3 and 4:
"Delta"="1" If the starting point of first persistent resource is not the last uplink sub-frame within 5 ms periodicity (for configuration1) and 10 ms periodicity (for configuration3 and configuration4)
"Delta"="1−number of UL sub-frames" If the starting point of first persistent resource is the last uplink sub-frame within 5 ms (for configuration1) or 10 ms periodicity (for configuration3 and configuration4)
"Delta"="1+number of DL sub-frames" or "Delta"="−1−number of DL sub-frames" if there is only one UL sub-frame within 5 ms periodicity (for configuration2)

For TDD configuration 5
"Delta"=0 (Multiple periodicities are not applicable because of only one HARQ process available)
Note that "delta" can be negative or positive.

The first set of rules above may determine delta for any configuration of TDD. However, such configurations only avoid one collision of initial transmission and retransmission. It is a simple implementation and valid when the number of uplink HARQ processes is less than 3 (i.e., for TDD configuration2 and configuration4). But when the number of uplink HARQ processes is larger than or equal to 3 (i.e., for TDD configuration1 and configuration3), some advanced method is needed to avoid more than one collision.

In order to further avoid the collision problem, an alternate set of rules for determining delta from the TDD configuration, and the HARQ processes, may be used.

Advance Rule: Each HARQ process relates to a delta value and the next periodicity/interval will be decided by the delta value in current HARQ process.

This advance rule is especially useful for TDD configuration 1 (4 HARQ processes) and TDD configuration 3 (3 HARQ processes) due to the existence of more than 2 HARQ processes. For TDD configuration 2 and TDD configuration 4, the rules above can also be implemented without modification.

For TDD configuration 0 and configuration 6, use the same delta value as before, that is, "0".

In TDD configuration 1
  When using the "counting UL sub-frames only" rule for delta value (exclude DL sub-frames when doing the timing): delta="1" for HARQ process 1~3; delta="−3" for HARQ process 4
  When not using the "counting UL sub-frames only" rule for delta value (timing is counted by both UL and DL sub-frames): delta="1" for HARQ process 1&3; delta="4" for HARQ Process 3; delta="−6" for HARQ process4
  So with such an advance rule to avoid more collisions, the multiple periodicity for each HARQ process of configuration 1 is as follows. T_L is assumed to be a long period and T_S is a short period temporarily. Both T_L and T_S are decided by the equation T1. If delta is a positive value, T_L is obtained in terms of the equation T1, otherwise T_S is derived.
    HARQ process 1: T_L T_L T_L T_S T_L T_L T_L T_S . . . , it means the HARQ process sequence is 1 2 3 4 1 2 3 4 . . .
    HARQ process 2: T_L T_L T_S T_L T_L T_L T_S T_L T_L T_L T_S . . . , it means the HARQ process sequence is 2 3 4 1 2 3 4 1 . . .
    HARQ process 3: T_L T_S T_L T_L T_L T_S T_L T_L T_L T_S . . . , it means the HARQ process sequence is 3 4 1 2 3 4 1 2 . . .
    HARQ process 4: T_S T_L T_L T_L T_L T_S T_L T_L T_L . . . , it means the HARQ process sequence is 4 1 2 3 4 1 2 3 . . .

In TDD configuration 2
  Whether to use −5 or 5 as delta value could be determined by a rule described below for determining which periodicity (longer one or shorter one) should be the starting one.
  Example: with the preferred rule described below, the starting periodicity is determined with the system frame number SFN: if SFN modulo 4<2, then delta="+5"; if SFN modulo 4 >=2, then delta="−5"

In TDD configuration 3
  When using the "counting UL sub-frames only" rule for delta value (exclude DL sub-frames when doing the timing): delta="1" for HARQ process 1~2; delta="−2" for HARQ process 3;
  When not using the "counting UL sub-frames only" rule for delta value (timing is counted by both UL and DL sub-frames): delta="1" for HARQ process 1~2; delta="−2" for HARQ process 3
  So with such advance rule to avoid more collisions, the multiple periodicity for each HARQ process of configuration 3 is as follows, the definition of T_L and T_S is same as TDD configuration)
    HARQ process 1: T_L T_L T_S T_L T_L T_S . . . it means HARQ process sequence is 1 2 3 1 2 3 . . .
    HARQ process 2: T_L T_S T_L T_L T_S T_L T_L T_S . . . it means HARQ process sequence is 2 3 1 2 3 1 . . .
    HARQ process 3: T_S T_L T_L T_S T_L T_L . . . it means HARQ process sequence is 3 1 2 3 1 2 . . .

In TDD configuration 4
  As an alternative to the first set of rules for delta above, a pattern where delta is always 1 could be used, but for HARQ process 2 the starting period would be T2 instead of T1. Or, alternatively, delta is −1 for HARQ process 2 as the starting point.

In this second set of rules, the delta determination is special for TDD configuration 2; it is related to the system frame number (SFN). In this second set of rules, the delta determination for TDD configuration 1 and configuration 3 is different with the short and long pattern sequence (compared to the first set of rules). The delta determination is the same for TDD configuration 0, 4, 5, and 6 compared to the first set of rules.

In general, the first set of rules above for determining delta is slightly preferred for simplicity, but either set of rules may be used with either of the first two embodiments.

In another embodiment approach of the present invention, the multiple periodicity for SPS allocations could be provided using a single RRC signaling resource. In this approach, a numerical value corresponding to the longer period (or a shorter period) would be signaled by the RRC layer. A simple method for determining the shorter period (or the longer period) for the SPS periodicity would be:

If signaled periodicity T is between X (small default value) and Y (large Default value),
    If T is close to X or in the middle range between X and Y, then the default periodicity is X. So T is a long periodicity T_L, then short periodicity T_S=2*X−T_L
    If T is close to Y, then the default periodicity is Y. So T is a short periodicity T_S, then long periodicity T_L=2*Y−T_S
  Then the final multiple periodicity pattern is [T_L T_S T_L T_S . . . ] or [T_S T_L T_S T_L . . . ], the pattern should always start with the signaled periodicity.

Now the values X and Y need to be available. These values would be provided as part of the existing parameters for the MAC layer parameters set known in the 3GPP technical specifications 36.331v8.2.0 as "semiPersistSchedIntervalDL" and "semiPersistSchedIntervalUL". These two parameters are defined at page 95 of the technical specifications document numbered TS 36.331 v8.2.0, available from the 3GPP project at www.3gpp.org.

Further, the UE can determine whether multiple periodicity is even enabled in the SPS allocation by comparing the T period to 10 milliseconds. If the signaled periodicity is not the multiple of 10 ms, then UE can implicitly know this is a multiple periodicity configuration. If the signaled periodicity is exactly the multiple of 10 ms, then UE can know this is a single periodicity configuration.

For example:
- If the signaled T=21, then 20<21<30, so X=20, Y=30, then 21 is much closer to 20, then long period T_L=21, short period T_S=2*20−21=19. The starting period is T_L.
- If the signaled T=28, then 20<28<30, so X=20, Y=30, then 28 is much closer to 30, then short period T_S=28, long period T_L=2*30−28=32. The starting period is T_S.

This particular embodiment does not require any changes to the previously defined signaling that exists in the proposed 3GPP specifications, and so may be a more flexible approach. The specification for 3G would be changed at TS 36.321 to implement this approach.

The different embodiment approaches above, with the various rules for determining the "delta" value for the embodiments where the periodicity is based on TDD configurations, each require one more determination. The multiple periodicity patterns may start with the longer period, or may start with the shorter period. An approach for determining which period to start with is needed.

There are several alternative approaches that may be used; each of these alternate rules will enable the system to determine the proper period T1 (the longer period if "delta" positive, otherwise, T1 is a shorter period), or T2 (the shorter one if "delta" is positive, otherwise T2 is a longer period), to start the multiple periodicity SPS allocation sequence. Any one of these, or another method, may be used with any of the approaches described above.

A) The longer period would always follow the activation of the SPS (SPS activation is done via a downlink message PDCCH to the UE)

B) The shorter period would always follow the activation of the SPS (activation done via a downlink message PDCCH)

C) UE specific starting point following SPS activation, e.g. if the field UE-ID (or complementary C-RNTI, SPS-CRNTI or some other UE identification field) would be paired with another UE property by some rules, for example both UE-ID and starting HARQ process of UE are even, then a longer period would follow activation, if unpaired then a shorter period would follow the activation. This is arbitrary and it may be selected to be the other way.

D) Whether the period T1 or T2 would be the starting position depends on the SFN, or the SFN of the activation of SPS.

E) The starting period could be configured in RRC. This alternative adds RRC signaling and is less preferred.

F) The starting period could be tied to the HARQ process which is defined by the activation time
  a. The HARQ process defines the delta value; if delta is big, always start with T1.

G) The T1 equation (a period plus a delta) will always determine the first time periodicity.

The simplest approach is preferred for the implementation costs, that is, rule G. Any of the other approaches may be used in the alternative.

FIGS. 8, 9 10, 11, 12, and 13 present examples of how implementations of the above embodiments work for the delta value obtained using either the first embodiment set of rules for obtaining delta, or the second embodiment set of rules, described above.

In FIG. 8, an example of TDD configuration 0 is depicted. The sub-frame index begins at 1 and goes to 20 for a single 10 millisecond frame. The configuration of the sub-frame as UL or DL is shown in the second row. HARQ processes may occur during the UL frames only, when the UE can retransmit previously transmitted frames.

For configuration 0, the delta value is set to 0 for all HARQ processes because, due to the configuration, conflicts are unlikely.

FIG. 9 illustrates another example implementation. In FIG. 9, the TDD configuration is 1. Referring to FIG. 5 this is another 5 millisecond periodicity example. The HARQ processes are again shown in the UL sub-frames. The delta value for process 1, which is not the last sub-frame in the period, and process 3, also not the last sub-frame in the period, is determined to be "1". The delta value for the HARQ process 2, which is the last sub-frame in the period, is determined to be −1 (1-2 UL sub-frames). The same delta is determined for HARQ 4. Alternatively, delta can also be defined to other values if the advance rule is used.

FIG. 10 illustrates the operation of the rules for TDD configuration 2. Referring to FIG. 5, this is another 5 millisecond periodicity example. In FIG. 10, the delta value determined using the first set of rules above would be 1+4=5 for both the HARQ processes 1 and 2 (also −1−4=−5 is another possibility). For the second set of rules, if the SFN number is used, the delta value for process 1 is −5, while the delta value for process 2 is +5.

FIG. 11 illustrates the operation of the rules for TDD configuration 3. Referring to FIG. 5, this is a 10 millisecond periodicity example. In FIG. 11, the delta value determined for HARQ processes 1, 2, and 3, occurring in UL sub-frames 3, 4, 5 as shown, would be (1, 1, −2) (the last one being 1-3 UL sub-frames in the period). The second rule described above also considers the pattern of the periodicity.

FIG. 12 illustrates the operation of the rules for TDD configuration 4, another 10 millisecond switch period configuration. In FIG. 12, the delta value for HARQ process 1 is again 1. The delta value for HARQ process 2 is −1 (1-2 UL sub-frames).

FIG. 13 illustrates the operation of the rules of the embodiments described above for a TDD configuration 6. (Note that for TDD configuration 5, multiple periodicity does not apply as only one HARQ process is available.)

Figure 14:
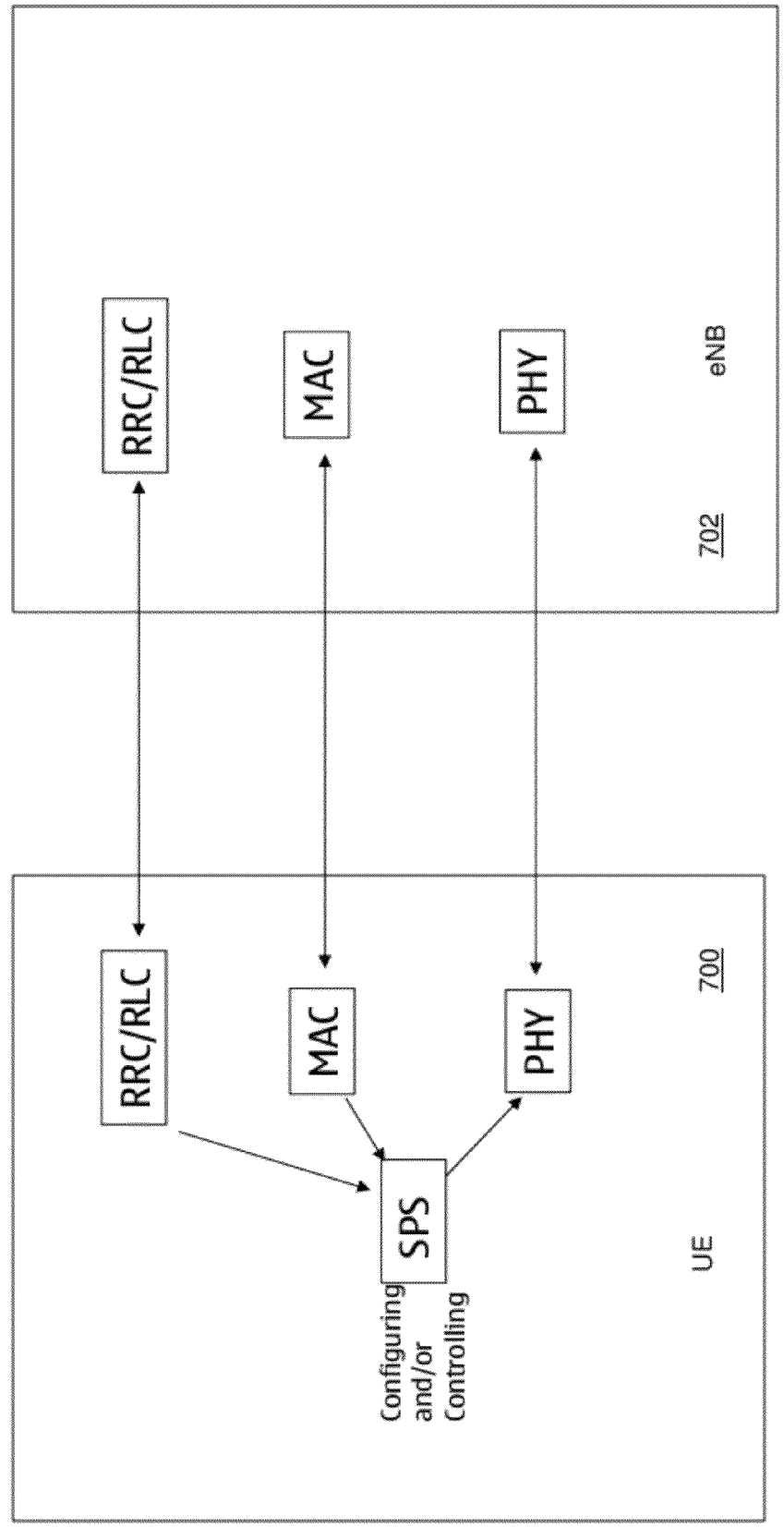
FIG. 14 illustrates a block diagram of a UE and an e-Node B for providing functions implementing portions of the embodiments of the invention.

FIG. 14 illustrates in block diagram form the communications and processes for implementing the multi-periodicity SPS allocation in a UE in communication with an e-Node B over an air interface. In FIG. 14, UE 700 includes parameters from the RRC and MAC layers, and a SPS function coupled to the PHY layer for operating the physical layer. E-Node B 702 is coupled to the UE over an air interface and provides messages from the RRC/RLC layer, the MAC layer, and the physical layer labeled PHY. In operation, the e-Node B may provide signals from the RRC and MAC layers to configure the e-Node B, including the TDD configuration and semi persistent scheduling. The UE can then implement embodiments of the present invention to determine the multiple periodicity for SPS allocations based on one of the embodiments using implicit rules. Alternatively, an RRC layer message can be sent to the UE with the value for the first time period T1 and the UE may use that value, with the X and Y parameters from the MAC layer, to determine the second time period T2.

The examples illustrated above are for a 10 millisecond RTT for the HARQ processes. Other RTT times could be used which would have similar impacts on the timing for SPS and HARQ and the embodiments of the present invention could be modified in that case to adjust for the different RTT time. These modifications would result in additional embodiments that are contemplated as part of the present invention and which fall within the scope of the claims to be presented.

Note that the implementation of any of the embodiments above may be performed in software, hardware, or firmware, and may be provided as a set of instructions that are retrieved from storage and executed by a programmable processor or other programmable device that is part of a UE or e-Node B implementation including without limitation core processors such as RISC, ARM, CPU, DSP and microcontroller cores, standalone integrated circuit devices, the method may be implemented as a state machine with associated logic circuitry, a FPGA or CPLD, ASIC, semi-custom IC or the like may be used. The storage may be non-volatile memory such as FLASH or programmed memory such as PROM, ROM, EPROM and the like. The storage may be a CD or DVD program storage medium containing the executable instructions for performing the embodiments. In one embodiment, executable instructions are provided on a computer readable medium that when executed, perform the method of determining the long and short periodicity for a multiple periodicity SPS allocation in a TDD communications system, using one of the rules above for the delta value, and for the pattern sequencing.

The illustrative embodiments described above are directed to an E-UTRAN system with TDD. However, the embodiments are not limited to this example application and the use of the embodiments in other communications systems to provide implicit rules for determining and configuring the multiple periodicity of semi-persistent scheduling of resources is envisioned as part of the present invention and within the scope of any claims presented.

What is claimed is:

1. A method, comprising:
    receiving a semi-persistent scheduling allocation;
    determining a delta value by using an implicit rule;
    determining a periodicity for a multiple periodicity semi-persistent scheduling allocation by using the delta value; and
    forming a multi-periodicity sub-frame pattern to receive and transmit time division duplex packets.

2. The method of claim 1, wherein using the implicit rule further comprises:
    determining from a time division duplex frame configuration defining uplink and downlink time division duplex sub-frames and a hybrid automatic retransmit request process, one implicit rule to use from a plurality of possible implicit rules; and
    determining the delta value based on the one implicit rule.

3. The method of claim 1, wherein using the implicit rule to calculate the delta value further comprises:
    determining from received parameters a selected time division duplex configuration which is one of a plurality of possible time division duplex configurations that may be selected;
    determining from received parameters a selected HARQ process that is one of a plurality of possible hybrid automatic retransmit request processes that may be selected; and
    performing a selection of a corresponding delta value based on the implicit rule.

4. The method of claim 3, wherein the possible time division duplex configurations are between an integer value of 0 and an integer value of 6 and if the selected time division duplex configuration is determined to be 1, and the hybrid automatic retransmit request process is determined to be one selected from 1 and 3, the delta value is calculated to be one; and if the hybrid automatic retransmit request process is either 2 or 4, the delta value is determined to be minus one.

5. The method of claim 3, wherein the possible time division duplex configurations are between an integer value of 0 and an integer value of 6 and if the selected time division duplex configuration is determined to be 2, the delta value is determined to be minus five or plus five, based on additional implicit rules.

6. The method of claim 3, wherein the possible time division duplex configurations are between an integer value of 0 and an integer value of 6 and if the selected time division duplex configuration is determined to be 3, and wherein the hybrid automatic retransmit request process is determined to be either 1 or 2, the delta value is calculated to be 1; and if the hybrid automatic retransmit request process is 3, the delta value is calculated to be either 2 or minus 2 based on additional implicit rules.

7. The method of claim 3, wherein the possible time division duplex configurations are between an integer value of 0 and an integer value of 6 and if the selected time division duplex configuration is determined to be 4, and the hybrid automatic retransmit request process is determined to 2, the delta value is calculated to be one selected from 1 and minus 1 based on additional implicit rules; and further if the hybrid automatic retransmit request process is 1, 3, or 4, the delta value is 1.

8. An apparatus comprising:
    a processor configured to:
    receive configuration information including a semi-persistent scheduling allocation;
    determine a delta value using an implicit rule stored within a user equipment;
    determine a periodicity for a multiple periodicity semi-persistent scheduling allocation by using the delta value; and
    form a multi-periodicity sub-frame pattern used to receive downlink time division duplex packets and transmit uplink time division duplex packets.

9. The apparatus of claim 8 wherein the processor is further configured to:
    determine, from a time division duplex frame configuration defining uplink and downlink time division duplex sub-frames and from a hybrid automatic retransmit request process, one implicit rule to use from a plurality of possible implicit rules; and
    determine the delta value based on the one implicit rule.

10. The apparatus of claim 8, wherein the processor is further configured to:
    form a periodic sub-frame pattern for a time division duplex frame to be used for packet communications, wherein the implicit rule depends on the system frame number where a semi-persistent schedule allocation begins.

11. The apparatus of claim 8, wherein determining the delta value further comprises:
    determining a selected time division duplex configuration wherein the possible time division duplex configurations are between an integer value of 0 and an integer value of 6, and if the TDD configuration is determined to be 0, 5, or 6, the calculated delta value is zero.

12. The apparatus of claim 8, wherein determining the delta value further comprises:
    determining a selected time division duplex configuration wherein the possible time division duplex configurations are between an integer value of 0 and an integer value of 6 and determining if the selected time division duplex configuration is 1; and
    if a hybrid autonomous retransmit request process in use is 1 or 3, calculating the delta value to be 1; and
    if the hybrid autonomous retransmit request process selected is 2 or 4, calculating the delta value to be minus 1.

13. The apparatus of claim 8 wherein determining the delta value further comprises:
- determining a selected time division duplex configuration wherein the possible time division duplex configurations are between an integer value of 0 and an integer value of 6 and determining if the selected time division duplex configuration is 2; and
- if a hybrid autonomous retransmit request process in use is 2, calculating the delta value to be 5 or +5, based on additional implicit rules.

14. The apparatus of claim 8 wherein determining the delta value further comprises:
- determining a selected time division duplex configuration wherein the possible time division duplex configurations are between an integer value of 0 and an integer value of 6 and determining if the selected time division duplex configuration is 3; and
- if the hybrid autonomous retransmit request process is 1 or 2, determining the delta value to be 1; and
- if the hybrid autonomous retransmit request process is 3, calculating the delta value to be 2 or −2 based on additional implicit rules.

15. The apparatus of claim 8, wherein determining the delta value further comprises:
- determining a selected time division duplex configuration wherein the possible time division duplex configurations are between an integer value of 0 and an integer value of 6 and determining if the selected TDD configuration is 4; and
- if the hybrid autonomous retransmit request process in use is 2, calculating the delta value to be 1 or −1 based on additional implicit rules; and
- if the hybrid autonomous retransmit request process in use is 1, 3 or 4, calculating the delta value to be 1.

16. The apparatus of claim 8, wherein the processor is further configured to:
- determine that the SPS allocation begins in an uplink sub-frame in the time division duplex frame, and the uplink sub-frame is not the last in a time division duplex frame period.

17. The apparatus of claim 8, wherein if semi-persistent scheduling allocation begins in an uplink sub-frame in a time division duplex frame that is the last sub-frame in a time division duplex frame period, a delta value is calculated that is 1 minus the uplink sub-frame number in the time division duplex frame period.

18. The apparatus of claim 8 wherein the periodicity for a multiple periodicity semi-persistent scheduling allocation comprises a first time period and a second time period, and the first time period is determined by adding the delta value to a nominal value for the time period, and the second time period is determined by subtracting a delta value from the nominal value time period.

19. The apparatus of claim 8, wherein the processor is further configured to retransmit previously transmitted packets over the air interface in response to a received hybrid autonomous retransmit request process request using the first and second time periods, wherein a collision between a retransmit packet and a newly received packet is prevented by the implicit rule.

20. A system comprising:
- one or more user equipment devices, comprising:
- a processor configured to:
- cause an apparatus to receive configuration information including a semi-persistent scheduling allocation from a transmitter;
- determine the frame periodicity for a multiple periodicity semi-persistent scheduling allocation to calculate a delta value using an implicit rule stored within the user equipment;
- determine from a time division duplex configuration in use by the transmitter a first time period and determining a second time period, by using the delta value; and
- form a periodic sub-frame pattern used to receive downlink time division duplex packets and transmit uplink time division duplex packets.

21. A non-transitory computer readable storage medium containing stored instructions that, when executed by a programmable receiver in a user equipment device, cause the user equipment to perform the steps of:
- receiving a semi-persistent scheduling allocation from a transmitter over an air interface;
- using an implicit rule to determine a delta value;
- determining a periodicity for a multiple periodicity semi-persistent scheduling allocation by using the delta value; and
- forming a multi-periodicity sub-frame pattern used to receive and transmit time division duplex packets over the air interface.

* * * * *